United States Patent [19]

Downey

[11] Patent Number: 4,843,511
[45] Date of Patent: Jun. 27, 1989

[54] MAGNETIC DISK CASSETTE HAVING INTERNAL BIASING RIBS

[75] Inventor: Rogers B. Downey, Lexington, Mass.

[73] Assignee: Polaroid Corporation, Cambridge, Mass.

[21] Appl. No.: 215,371

[22] Filed: Jul. 5, 1988

Related U.S. Application Data

[63] Continuation of Ser. No. 781,060, Sep. 27, 1985, abandoned.

[51] Int. Cl.$^4$ ............................................. G11B 23/03
[52] U.S. Cl. ................................................... 360/133
[58] Field of Search ........................... 360/133, 97, 99; 206/444

[56] References Cited

U.S. PATENT DOCUMENTS

| | | | |
|---|---|---|---|
| 3,975,768 | 8/1976 | Jacques et al. | 360/99 |
| 4,131,199 | 12/1978 | Hatchett et al. | 206/444 |
| 4,149,207 | 4/1979 | Porter, Jr. et al. | 360/133 |
| 4,291,353 | 9/1981 | Fletcher et al. | 360/128 |
| 4,301,468 | 11/1981 | Brown et al. | 360/99 |
| 4,466,037 | 8/1984 | Yoshida et al. | 360/133 |
| 4,481,552 | 11/1984 | Dona et al. | 360/97 |
| 4,510,546 | 4/1985 | Asami et al. | 360/133 |
| 4,626,949 | 12/1986 | Brock et al. | 360/133 |

FOREIGN PATENT DOCUMENTS 0020374  2/1985  Japan ................... 360/133

OTHER PUBLICATIONS

Boyles, "Self-Pressurized Enclosure for Flexible Magnetic Disks," IBM TDB, Jan. 1977, vol. 19, No. 8, pp. 3177-3178.

Primary Examiner—Stuart N. Hecker
Assistant Examiner—David J. Severin
Attorney, Agent, or Firm—John S. Vale

[57] ABSTRACT

A magnetic disk cassette of simplified design is provided for improving the disk cleaning function of a cassette liner and for stablizing the lateral motion of a magnetic disk rotating within the cassette in the region where the disk is coupled to a magnetic head for data recording or reproduction purposes. The magnetic disk cassette includes a magnetic disk and a pair of friction reducing, disk-cleaning liners with one liner being located on each side of and immediately adjacent the magnetic disk. When the magnetic disk cassette is fully assembled, the magnetic disk is sandwiched between the liner and a pair of disk-enclosing covers. In addition, a set of tapered, radially-extending ribs are formed on the inside major surface of each cover in a generally opposed relation such that when the disk and liners are sandwiched between the assembled covers, opposed tapered ribs engage and temporarily deform a portion of the disk and adjacent liners to thereby improve the cleaning function of the liners and stabilize the lateral movement of a portion of the magnetic disk lateral to its direction of rotation in the region coupled to the magnetic head, a region that is circumferentially spaced a predetermined distance from a radially-extending set of tapered ribs.

2 Claims, 3 Drawing Sheets

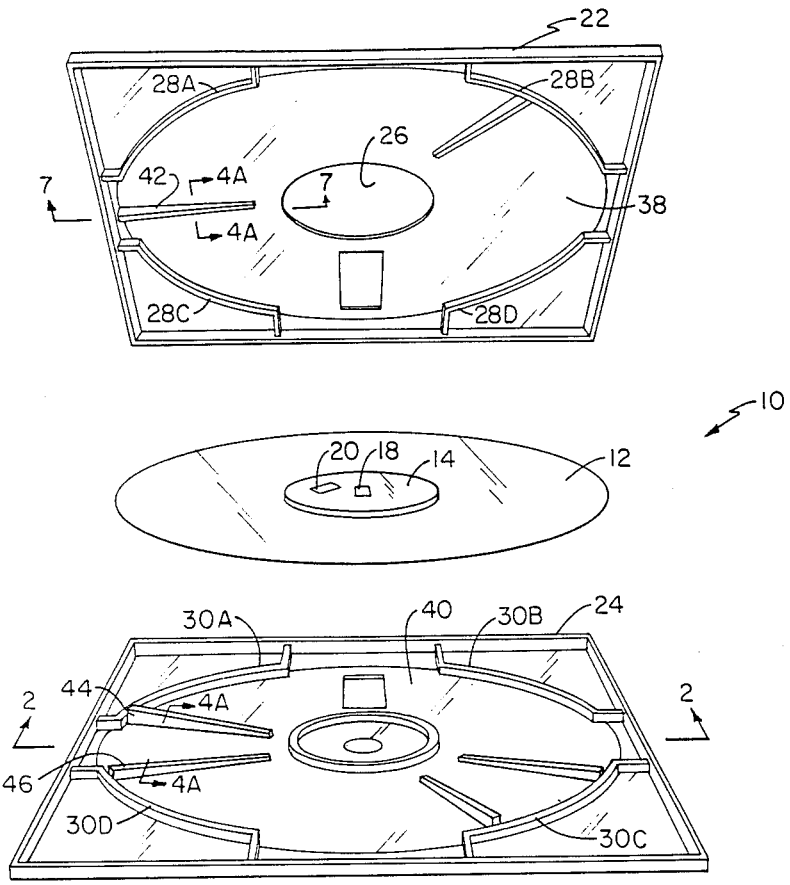
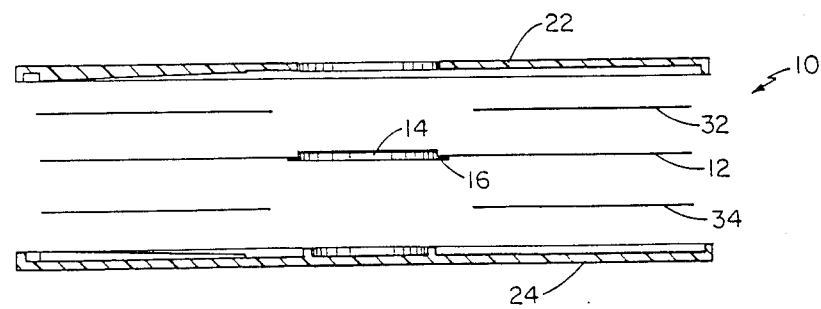
FIG 1
FIG 2

MAGNETIC DISK CASSETTE HAVING INTERNAL BIASING RIBS

This is a continuation application of pending prior application Ser. No. 781,060 filed on Sept. 27, 1985 by Rogers B. Downey for MAGNETIC DISK CASSETTE HAVING INTERNAL BIASING RIBS, now abandoned.

BACKGROUND OF THE INVENTION

The present invention relates to a cassette formed of a relatively hard material suitable for enclosing a flexible magnetic disk that is rotatable within said cassette, in general, and to simplified means for enhancing the cleaning of, and for stabilizing the motion of, said flexible disk as it is rotated within said cassette, in particular.

Flexible or floppy magnetic disks are widely used as recording media for computers because of their ease of handling and their relatively low cost. A floppy disk is a flexible disk of polyester resin that is coated on one or both sides with magnetic materials on which digital information can be stored or from which such information can be retrieved by a magnetic head as a portion of the flexible disk is rotated past the magnetic head at a relatively high rate of speed in contact therewith or in relatively close proximity thereto.

Floppy disks are usually contained in a flexible jacket formed with a generally rectangular opening that serves as a magnetic head access window and with a center opening for engagement of the disk with a disk drive. In such an arrangement, it is possible for dust or foreign matter to enter the flexible jacket through these openings and to be deposited on the recording medium. On recording media disks with high information density, dust or foreign matter may cause a brief separation of the magnetic head from the recording media and an attendant loss of data from said recording media, a phenomenon that is also referred to as dropout. Also, there is currently a trend toward making a recording media smaller in size (i.e., $3\frac{1}{2}$ inch diameter disks as opposed to $5\frac{1}{4}$ and 8 inch diameter disks currently in widespread use). These smaller disks (sometimes referred to as micro-disks) have the advantage that they are very easily transported, even in a shirt or coat pocket. However, this advantage may well lead to increased exposure to dropout producing contaminants.

There are existing designs that provide a measure of contaminant protection to these smaller diameter micro-disks. In general, these designs provide a case or enclosure which is more rigid or durable than the traditional floppy disk jacket. In addition, a shutter is provided to keep dust and foreign matter from entering the case through the magnetic head access window. Like the soft jacketed floppy disks, these newer hard jacketed micro-disks usually include wiping fabrics or cleaning sheets often made of non-woven material that are adhered to the inside of both halves of the jacket or cartridge to wipe any debris from the floppy disk as it is rotated by the disk drive. These sheets also prevent abrading or wearing of the floppy disk by inside surfaces of the hard floppy disk enclosure.

In one previous design, described in U.S. Pat. No. 4,510,546 to ASAMI ET AL, a flexible spring-force member or lifter is provided on an inside surface of the hard disk-enclosing case that presses a portion of a cleaning sheet against a surface of the floppy disk to thereby enhance the cleaning action of each of said cleaning sheets. The spring-force member is adhesively attached to said inside surface and a radially extending rib molded on the same inside surface cooperates with said spring-force member to provide the required cleaning-action-enhancing spring-force. Disadvantages associated with a spring-force providing member of this type include the necessity of providing an additional piece-part for the magnetic disk cassette (the flexible spring-force member), the difficulty of consistently fabricating a spring member of this type that will provide the same desired spring force level when installed in each cassette, and the normal change in the magnitude of the spring-force provided by a lifter or spring-force member, fabricated from materials such as synthetic resins, that naturally occurs as a result of the aging process.

It is a primary object of the present invention, therefore, to provide spring-force means for enhancing the cleaning function of a liner located within a magnetic disk cassette that will require no additional cassette piece-parts.

It is another object of the present invention to provide spring-force means for enhancing the leaning function of a disk-cleaning liner included within a magnetic disk cassette that will readily and consistently provide the desired spring-force level at the time that a magnetic disk cassette is being manufactured.

It is another object of the present invention to provide spring-force means for enhancing the cleaning function of a disk cleaning liner included within a magnetic disk cassette that will provide a consistent spring force level over an extended period of time.

It is yet another object of the present invention to provide spring-force means for a magnetic disk cassette that will stabilize magnetic disk movement lateral to the direction of disk rotation in the region where the magnetic head and the rotating disk magnetically interact with one another.

It is a further object of the present invention to provide spring-force means for a magnetic disk cassette that is capable of laterally positioning the magnetic disk to a predetermined location in the region near the magnetic head, while the magnetic disk is being rotated.

SUMMARY OF THE INVENTION

In accordance with the present invention, an improved magnetic disk cassette is provided for enhancing the disk cleaning function of a cassette liner, for laterally positioning the magnetic disk to a predetermined location in the region where the magnetic disk is magnetically coupled to the magnetic head and for stabilizing magnetic disk movement lateral to the direction of disk rotation. The magnetic disk cassette includes a flexible magnetic disk having a magnetic coating on at least one side thereof and a liner adjacent the coated disk side sandwiched between a pair of relatively hard disk-enclosing covers. A set of tapered generally radially extending ribs are formed on the major inside surface of each of said covers in a generally opposed relation. When the magnetic disk cassette is fully assembled such that the magnetic disk and adjacent liner are sandwiched between the cassette covers, the projecting ends of a set of opposed tapered ribs engage and temporarily deform a portion of the disk and the liner adjacent thereto to thereby enhance the liner's cleaning function and to stabilize the lateral movement of, as well as the lateral position of, a portion of the rotating magnetic disk at a location circumferentially spaced a predetermined distance from said tapered rib set.

BRIEF DESCRIPTION OF THE DRAWINGS

FIG. 1 is an exploded view, in perspective, of a magnetic disk cassette, excluding disk liners, incorporating a preferred embodiment of the inventive concept of the present invention.

FIG. 2 is an exploded elevational view of the improved magnetic disk cassette of the present invention taken on the line 2—2 in FIG. 1, showing disk components, including disk liners, in closer proximity than that shown in said FIG. 1.

DESCRIPTION OF THE PREFERRED EMBODIMENTS

Figure 3:
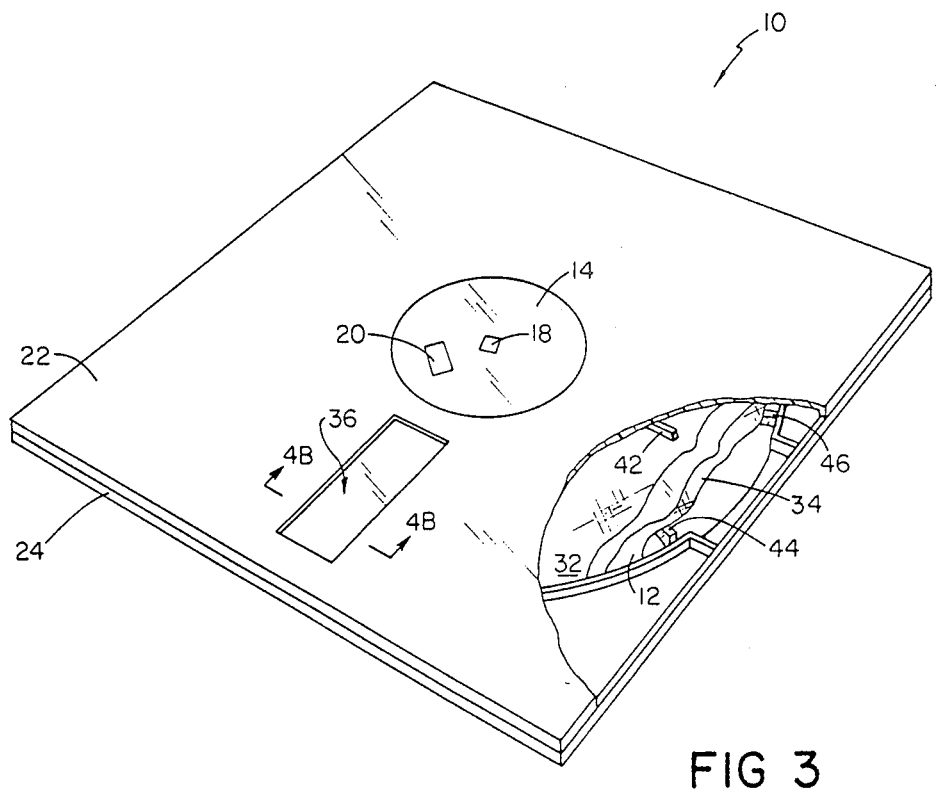
FIG. 3 is a perspective view of the magnetic disk cassette of FIGS. 1 and 2 fully assembled having cutaway portions to facilitate the detailed description thereof.

Referring now to FIGS. 1, 2 and 3 of the drawings, there is shown magnetic disk cassette 10 incorporating a preferred embodiment of the inventive concept of the present invention. Magnetic disk cassette 10 includes circular magnetic disk 12 consisting of a thin disk-like polymeric film base and a magnetic layer coated uniformly on opposite surfaces of the film base. A circular aperture is formed in the center of magnetic disk 12. Circular center plate 14, having flange portion 16 at its periphery, projects through said circular opening and is attached, at its flanged periphery, to that portion of the magnetic disk immediately adjacent said circular disk aperture by a suitable adhesive applied to both the flange portion of said center plate 14 and that portion of magnetic disk 12 immediately adjacent said center plate flange portion. Center plate 14 is formed from a thin metallic plate and includes a generally square-shaped aperture 18 into which a shaft (not shown) is inserted for the purpose of coupling the rotary motion of a drive motor (not shown) to magnetic disk 12. Center plate 14 also includes magnetic disk positioning or locating pin aperture 20 spaced a predetermined distance from drive shaft aperture 18.

When fully assembled as in FIG. 3, magnetic disk 12 including center plate 14 adhesively attached thereto, is enclosed within a relatively hard plastic jacket or casing comprising upper cover 22 and lower cover 24. Covers 22 and 24 are formed by an injection molding process from an ABS resin and may be snap-fitted together or be ultrasonically welded together at their outer edges or peripheries. A circular aperture 26 is formed in the center of upper cover 22 and center plate 14, having somewhat smaller diameter than aperture 26, sits loosely within said aperture 26. A set of arcuate ribs 28A, 28B, 28C and 28D in upper cover 22 and a mating set of arcuate ribs 30A, 30B, 30C and 30D in lower cover 24 limit the horizontal (as viewed in the drawings) lateral movement of magnetic disk 12 whenever said disk is rotated within covers 22 and 24 when in the assembled configuration shown in drawing FIG. 3.

A pair of liners 32 and 34 made of a non-woven fabric, such as rayon, are included within magnetic disk cassette 10 to remove dust from the surfaces of magnetic disk 12 and thereby prevent dropout, as defined above, and to prevent wear of the coatings on magnetic disk 12 by the major inside surfaces of covers 22 and 24 whenever disk 12 is rotated within said covers 22 and 24 by suitable drive means. Liner 32, generally circular in shape and having the same diameter as magnetic disk 12, is bonded to the major inner surface of upper cover 22 and liner 34, identical in shape to liner 32, is bonded to the major inner surface of lower cover 24. To facilitate the description of magnetic disk casette 10, liners 32 and 34 have been omitted from FIG. 1.

In covers 22 and 24 and in liners 32 and 34, there are formed radially extending rectangular openings having the same shape and size. When fully assembled, these apertures are in registration with one another. When magnetic disk cassette 10 is placed in its operative position within a data recording/reproduction system, one or more magnetic heads are brought into contact with one or both surfaces of magnetic disk 12 through the rectangular apertures in cover 22 and liner 32 shown at 36 in drawing FIG. 3 and/or cover 24 and liner 34, apertures that, for convenience only, have not been shown in the drawings. In a data recording/reproduction system where a single magnetic head is employed to contact one surface of the magnetic disk through, for example, the overlapping rectangular apertures formed in cover 22 and liner 32, a head pad would be simultaneously inserted through the overlapping rectangular apertures 36 formed in cover 24 and liner 34 to provide a support surface against which mechanical forces from the magnetic head at the opposite side of the magnetic disk are reacted.

In addition to the above-described structural features, magnetic disk cassette 10 also includes two sets of generally radially extending tapered ribs molded into each of the major inner surfaces 38 and 40 of upper cover 22 and lower cover 24, respectively, during the cover molding process. The lap rib sets serve several important and distinct functions. One function of a rib set is to apply a force to each liner such as liners 32 and 34 in drawing FIGS. 2 and 3 and thereby enhance the cleaning function of these liners as the magnetic disk is rotated by the disk drive motor within magnetic disk cassette 10. Another function of a rib set is to place a backtorque or a drag on the rotating magnetic disk in a direction opposite to the force provided by the disk drive motor to stabilize magnetic disk movement lateral to it direction of rotation in the vicinity of the magnetic head or heads. Another function of a rib set is to laterally position the magnetic disk relative to the magnetic head if such positioning is necessary, to further stabilize lateral magnetic movement. A magnetic disk cassette may have a single set of ribs or more than the two sets of tapered ribs shown in drawing FIG. 1 if the design considerations for the magnetic disk cassette so dictates. The use of multiple sets of ribs will distribute the force applied to the rotating magnetic disk which, among other things, will reduce magnetic disk wear at the point where the force is applied.

Figure 4A:
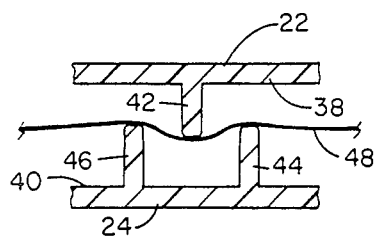
FIGS. 4A, 5A and 6A are sectional views taken on the line 4A—4A in FIG. 1 for different rib-height configurations showing the alternate embodiments of equal rib height, upper cover rib height greater than lower cover rib height, and lower cover rib height greater than upper cover rib height, respectively.

A tapered rib set consists of at least two ribs with at least one rib being located on each of the major inner surfaces of the covers of a cassette and with said ribs being positioned in a generally opposed relation with respect to one another when the magnetic disk cassette is fully assembled. However, the preferred make-up of a rib set is a three rib set as shown in drawing FIG. 1. As noted above, magnetic disk casette 10 includes two sets of molded ribs and each set contains the same three rib configuration with each set being circumferentially displaced on cassette covers 22 and 24 approximately 120° from one another. One rib set includes a single tapered rib 42 molded on major surface 38 of upper cassette cover 22 and two opposed ribs 44 and 46 molded on major surface 40 of lower cassette cover 24. As shown in FIG. 4A, which is a sectional view taken on the lines 4A—4A in FIG. 1, when magnetic disk cassette 10 is fully assembled radially extending rib 42 on surface 38 of cover 22 is located approximately midway between opposed radially extending ribs 44 and 46 on surface 40 of cover 24. The projecting height of each of the ribs 42, 44 and 46 as shown in FIG. 4A is the same and their vertical dimensions produce a degree of overlap. The term "overlap" generally means that the combined vertical height of ribs 42 and 44, for example, is greater than the spacing between major surfaces 38 and 40 of covers 22 and 24 when magnetic disk cassette 10 is fully assembled at any selected point along the radial dimension of said ribs 42 and 44. When ribs 42, 44 and 46 are in the relative positions shown in FIG. 4A, the upward or downward projecting ends of said ribs cause a U-shaped bend or wave like deformation of the layer combination 48 consisting of magnetic disk 12, upper liner 32 and lower liner 34. Bending of a magnetic disk can also be achieved where the combined vertical dimension of opposing ribs is less than the dimension between, for example, major inner surfaces 38 and 40 if the magnetic disk is fabricated from an extremely thick base material. The term "overlap" as used herein is intended to include such an arrangement.

Figure 4B:
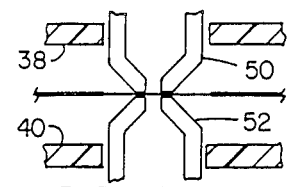
FIGS. 4B, 5B and 6B are partial sectional views taken on the line 4B—4B in FIG. 3 for different magnetic head configurations showing magnetic disk and liner positions relative to a magnetic head for the corresponding rib-height configurations shown in FIGS. 4A, 5A and 6A, respectively.

The projecting ends of ribs 42, 44 and 46 and the spring-force inherent in the polyester resin base of magnetic disk 12 against which said projecting rib-ends are reacted for the purpose of deforming layer combination 48 combine to urge liners 32 and 34 into solid contact with the adjacent surfaces of magnetic disk 12. By urging liners 32 and 34 into such solid engagement with disk 12 in this manner, the cleaning of the surfaces of magnetic disk 12 as it is rotated within covers 22 and 24 of magnetic disk cassette 10 by stationary liners 32 and 34, is greatly enhanced. In addition, the drag or the resistance to the rotation of disk 12 is thereby increased which substantially reduces movement of disk 12 lateral to the direction of rotation thereof by the disk drive in the region where the disk interacts with one or more magnetic heads. With reference to FIG. 4B of the drawings, by reducing the degree of lateral movement of disk 12 during disk rotation, improved magnetic coupling between disk 12 and magnetic heads 50 and 52, circumferentially spaced from ribs 42, 44 and 46, will result which will substantially improve the data recording/reproduction process.

In some data recording/reproduction systems, only one side of the magnetic disk is coated with magnetic media and therefore only one magnetic head is employed for data recording/reproduction purposes. Such arrangements are shown in drawing FIGS. 5A and 5B and in drawing FIGS. 6A and 6B. In the two magnetic head configuration of FIG. 4B, it has been determined that for optimum data recording/reproduction, magnetic disk 12 should enter the region between magnetic heads 50 and 52 from a plane located midway between surfaces 38 and 40 of cassette covers 22 and 24 respectively. However, in data recording/reproduction systems employing a single magnetic head for use with a magnetic disk having magnetic media coated on only one side thereof, it has been determined that for optimum data recording/reproduction, the magnetic disk should enter the region between the magnetic head and its associated head pad mounted in an opposed relation therefrom, from a position other than the above-defined plane within cassette covers 22 and 24.

Figure 5A:
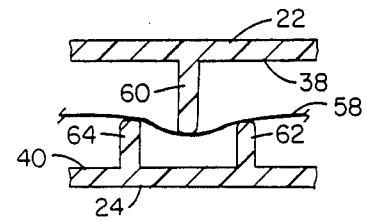
Figure 5B:
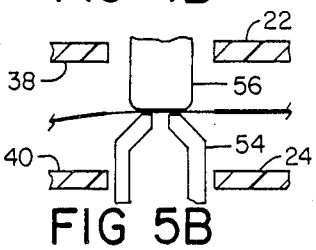

In FIG. 5B, for example, where a single magnetic head 54 and opposed head pad 56 are employed on opposite sides of a disk having a magnetic coating on only one side thereof, the combination of magnetic disk and liners 58, similar to layer combination 48 in FIG. 4A, approach the region between magnetic head 54 and head pad 56 from the cover 24 side of magnetic disk cassette 10. The combination of magnetic disk and liners 58 is positioned closer to cover 24 in the region of magnetic head 54 and head pad 56 by providing a set of ribs 60, 62, and 64 where two of the three ribs 62 and 64 are of unequal (shorter) height. In FIG. 5A, which is an alternate embodiment of the present invention, the height of rib 60 projecting from surface 38 of cover 22 is approximately twice the height of pair of ribs 62 and 64 projecting from surface 40 of cassette cover 24.

Figure 6A:
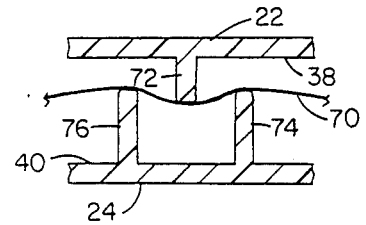
Figure 6B:
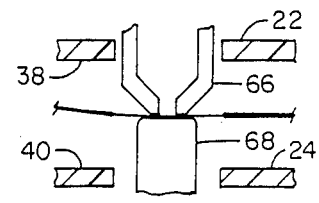

Similarly, in FIG. 6B where a single magnetic head 66 and an opposed head pad 68 are employed on opposite sides of a disk having had a magnetic coating on only one side thereof, the combination of magnetic disk and liners 70, similar to layer combination 48 in FIG. 4A, approach the region between magnetic head 66 and head pad 68 from the cover 22 side of magnetic disk cassette 10. The combination of magnetic disk and liner 70 is positioned closer to cover 22 in the region of magnetic head 66 and head pad 68 by providing a set of ribs 72, 74 and 76, where the height of rib 72 is shorter than the height of ribs 74 and 76. In FIG. 6a, which is another alternate embodiment of the present invention, the height of rib 72 projecting from surface 38 of cover 22 is approximately one-half the height of pair of ribs 74 and 76 projecting from surface 40 of cassette cover 24.

Rib overlap and the extent of circumferential spacing of the ribs within a rib set have a major effect on the level of drag or backtorque to which the rotating magnetic disk such as disk 12 in FIG. 1 will be subjected. With other factors remaining the same, the greater the rib overlap and/or the closer that ribs within a rib set are to one another, the greater will be the level of drag on magnetic disk 12 when rotated within magnetic disk 10.

Figure 7:
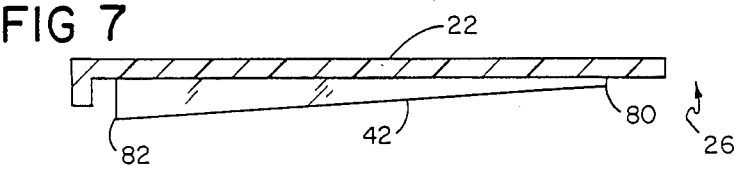
FIG. 7 is a sectional view taken on the line 7—7 in drawing FIG. 1.

As noted above, all of the ribs projecting from the surfaces 38 and 40 of covers 22 and 24, respectively, are tapered. One such rib is shown in drawing FIG. 7, which is a sectional view taken on the line 7—7 in drawing FIG. 1. As shown in drawing FIG. 7, the height of radially extending rib 42 changes, at a constant rate from a minimum height at 80 adjacent aperture 26, to a maximum height at 82. While it is not necessary that a rib or a rib set span the entire magnetic disk from center plate 14 (FIG. 2) to its outer peripheral edge in order to obtain the required level of disk drag and cleaning, it is essential that rib height increase at a fairly constant rate as the radial length of dimension of the ribs increase in order to compensate for the change in magnetic disk stiffness that naturally occurs in disk 14 from its center to its peripheral edge. The reason for this change in stiffness (best understood by referring to FIG. 2) results from the fact that magnetic disk 12 is supported at its center by center plate 14 and is unsupported at its periphery. If rib height remained constant or did not change in the radial direction, there would be a nonuniform distribution of the frictional or drag forces on magnetic disk 12 in a radial direction which would result in premature wearing or abrading of the magnetic disk surfaces near the center of the disk and in nonuniform disk cleaning.

It will be apparent to those skilled in the art from the foregoing description of my invention that various improvements and modifications can be made without departing from its true scope. The embodiments described herein are merely illustrative and should be not be viewed as the only embodiments that might encompass my invention.

What is claimed is:

1. A disk cassette comprising:
    a substantially thin casing having a pair of opposed and spaced inwardly facing major surfaces;
    a flexible disk adapted to have information recorded on at least one side thereof and/or retrieved therefrom, said disk being disposed between said pair of major surfaces for rotation relative thereto in a given plane;
    a pair of liners for respectively cleaning opposite sides of said disk, each of said liners being disposed between one of said major surfaces and a corresponding facing side of said disk, said liners being attached to said casing and being configured to wipe a corresponding side of a said disk when urged into contact therewith while the disk is caused to rotate within said casing;
    at least one set of cooperating generally radially extending ribs for engaging and urging said liners into selective engagement with the opposite sides of the disk therebetween, said set of ribs including a pair of angularly spaced ribs on one of said major surfaces and a single rib on said opposite major surface located between said pair of ribs circumferentially, said ribs serving to apply a deforming force to said liners and disk which induces a U-shaped bend therein that displaces a portion of said disk from said given plane in the vicinity of said rib set to facilitate disk cleaning and enhance stability of the disk in a direction transverse to the direction of disk rotation, said ribs being tapered so as to project gradually increasing distances away from said major casing surfaces toward said disk the further the said ribs extend radially outwardly of said casing, whereby said tapered ribs serve to exert a substantially uniform drag force radially across said disk when it is caused to rotate within said casing.

2. The disk cassette of claim 1 including plurality of said sets of ribs.

* * * * *